United States Patent [19]

Yamada et al.

[11] Patent Number: 5,103,485
[45] Date of Patent: Apr. 7, 1992

[54] PATTERN INFORMATION READING APPARATUS

[75] Inventors: Yasuhiro Yamada, Yokohama; Yasuko Miyazaki; Mikiharu Matsuoka, both of Tokyo; Takashi Kanemoto, Machida; Hirohiko Katayama, Kawasaki, all of Japan

[73] Assignee: Canon Kabushiki Kaisha, Tokyo, Japan

[21] Appl. No.: 327,001

[22] Filed: Mar. 22, 1989

[30] Foreign Application Priority Data

Mar. 29, 1988 [JP] Japan .................. 63-073242
May 25, 1988 [JP] Japan .................. 63-125657

[51] Int. Cl.$^5$ .................................. G06K 9/00
[52] U.S. Cl. ............................ 382/1; 382/14
[58] Field of Search ............ 382/1, 14, 15; 434/113, 434/114

[56] References Cited

U.S. PATENT DOCUMENTS

| 4,327,354 | 4/1982 | Persoon | 382/15 |
| 4,451,929 | 5/1984 | Yashida | 382/15 |
| 4,461,028 | 7/1984 | Okubo | 382/15 |
| 4,881,900 | 11/1989 | Matsuoka et al. | 434/113 |

FOREIGN PATENT DOCUMENTS 2334929 1/1974 Fed. Rep. of Germany .
1443924 7/1976 United Kingdom .

OTHER PUBLICATIONS

"Elektronische Lesegeraete und Orientierungshilfen fur Blinde", in Deutsche Medizinische Wochenschaft, Nov. 1974, pp. 2411–2418.
"Mehrkanaliger Elektrophthalm nach Starkiewicz", in Augenoptik 92 (1975) 5, pp. 134–137.

*Primary Examiner*—Leo H. Boudreau
*Attorney, Agent, or Firm*—Fitzpatrick, Cella, Harper & Scinto

[57] ABSTRACT

The invention relates to a pattern information reading apparatus in which pattern information such as characters or figures is read and stored in a memory and, thereafter, the stored pattern information is converted into tactile information and output as necessary. The apparatus has means for adjusting a moving speed of the pattern information which is output as tactile information. The apparatus is fitted to the reading capability of the user by such an adjustment. The apparatus also has means for comparing to see if the information which has been read at a preceding time point coincides with the information which was read at the present time point or not with respect to the pattern information such as characters or figures. By updating the different read information, the amount of storage data can be reduced.

5 Claims, 6 Drawing Sheets

PATTERN INFORMATION READING APPARATUS

BACKGROUND OF THE INVENTION

1. Field of the Invention

The present invention relates to a pattern reading apparatus for optically reading pattern information such as characters, symbols, figures, or the like and for displaying it by a tactile display and, more particularly, to a pattern information reading apparatus comprising: means for optically reading concentration pattern information; and means for displaying and outputting the read pattern information as tactile information which is tactile by a finger tip or the like.

2. Related Background Art

Hitherto, there has been put into practical use a reading device for the blind in which pattern information which was optically read is converted into an electric signal, the electric signal is output to a tactile information display to vibrate a bimorph tactile array arranged like a matrix, and the read pattern is displayed. According to such a construction, even a person who has an eyesight disease can discriminate and understand an ordinary document which is not in Braille. Such a kind of apparatus has been disclosed in, for instance, Japanese Patent Publication No. 56-46854.

However, since such a kind of conventional apparatus does not have means for storing the read pattern information, it is limited to the application of permitting a user to discriminate and understand a document in real time, in which the read pattern information is merely directly displayed by the tactile display. Therefore, for instance, once a document has been read past a certain location, if it is desired to again refer to a portion which has already been read, reading must be repeated from the beginning of the document. Further, if it is desired to store or record the information which has already been read, the read information must be recorded by using a Braille typewriter or the like. As mentioned above, since in addition to the reading apparatus, the Braille typewriter or the like must be carried, this situation is troublesome. On the other hand, the read information cannot be recorded by such a method at a location, e.g., in a library or the like, where the sound of operation of the apparatus becomes noise. Such a drawback is the first subject for improvement by the present invention.

On the other hand, if all of the read pattern information is sequentially stored into memory means, the amount of data to be stored extremely increases greatly, so that the costs of the apparatus rises. To prevent such a problem, it is necessary to reduce the amount of data to be stored into the memory means and to reduce the cost. This is the second subject addressed by the present invention.

SUMMARY OF THE INVENTION

It is the first object of the present invention to provide a pattern reading apparatus in which read pattern information is stored and can be reproduced and output as tactile information as necessary in consideration of the first subject mentioned above.

The second object of the invention is to provide a cheap pattern reading apparatus by efficiently storing read pattern information, in consideration of the second subject.

BRIEF DESCRIPTION OF THE DRAWINGS

FIGS. 1 to 3 relate to an embodiment of the present invention to solve the problem of the first subject;

More specifically.

FIGS. 4 to 6 relate to another embodiment to solve the problem of the second subject;

More specifically.

DETAILED DESCRIPTION OF THE PREFERRED EMBODIMENTS

The present invention will be described in detail hereinbelow on the basis of the first and for reading that data from the memory for display, shown in the drawings with respect to the first and second subjects, respectively.

Figure 1:
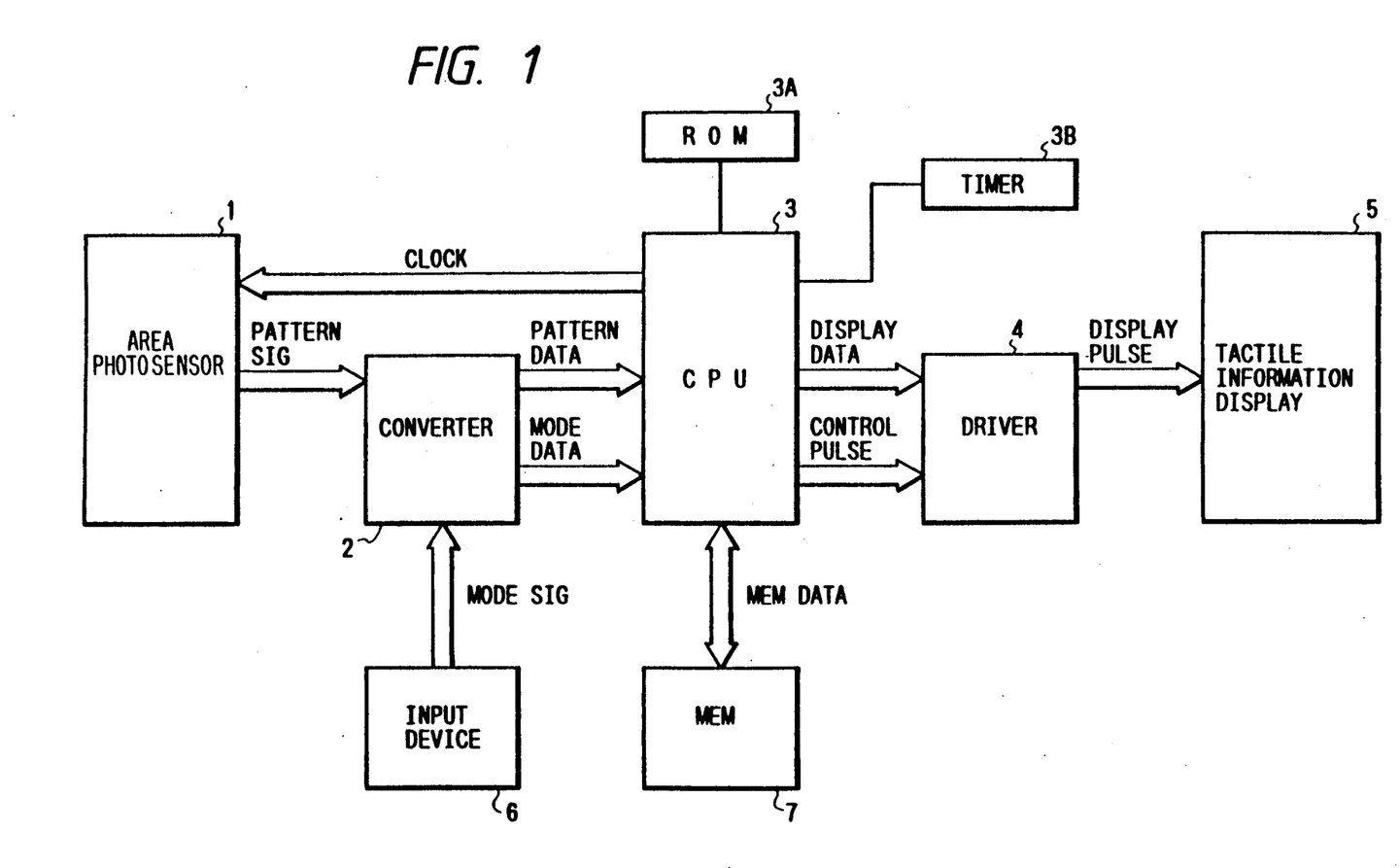
FIG. 1 is a block diagram showing a construction of the first embodiment of a pattern information reading apparatus to which the invention is applied.

FIG. 1 is a block diagram showing a construction of a pattern information reading apparatus as the first embodiment of the present invention.

In the diagram, reference numeral 1 denotes an area photosensor for optically detecting two-dimensional concentration pattern information in a certain area and converting that information into an electric signal in order to read characters. The area photosensor 1 operates in accordance with a clock pulse which is given from a CPU 3. A pattern signal of a predetermined format to express the read concentration pattern is input to a converter 2.

The converter 2 converts output signals from the area photosensor 1 and an operation input device 6 into digital signals and comprises an A/D converter and the like.

The input device 6 comprises a keyboard, switches, and the like and is used to set the operating mode of the apparatus. An output signal of the input device 6 is similarly converted into digital data and input to the CPU 3. At least a memory mode and a read mode, respectively for storage of the input data and for reading that data from the memory for display, can be set by the input device 6. The CPU 3 comprises a microprocessor and the like and controls the data input and output operations of the apparatus. A ROM 3A to store a control program, which will be explained below, and a timer 3B for the sequence control are connected to the CPU 3.

In this embodiment, the data read by the area photosensor 1 is not only displayed and output by a tactile information display 5 but also stored into a memory 7 comprising a RAM or the like and can be read out of the memory 7 and output to the tactile information display 5 as necessary.

The CPU 3 outputs display data of a format which can be tactile displayed by the tactile information display 5 and a control pulse to a driver 4. The driver 4 outputs a display pulse in the form of a voltage or a current which can drive the display 5 to the display 5, thereby allowing the input data or the data stored in the memory 7 to be tactilely displayed.

The tactile information display 5 comprises a well-known bimorph tactile array or the like. Tactile pins arranged like a matrix are vibrated, thereby outputting pattern information which is tactile by a finger tip or the like.

The operation of each section mentioned above will now be described.

The CPU 3 shown in the diagram outputs a clock pulse to the area photosensor 1. Each time the clock pulse is input, the area photosensor 1 reads the information line by line and outputs the information as a pattern signal.

The converter 2 converts the pattern signal into a digital signal and outputs the pattern data to the CPU 3. The CPU 3 compares the pattern data with a preset reference value TH. When the pattern data is larger than the reference value TH, it is determined that the pattern signal indicates a pattern portion having a dark level. When the pattern data is smaller than the reference value TH, it is decided that the pattern signal denotes a pattern portion having a bright level. Thus, the data corresponding to the dark or bright level is output together with the control pulse to the driver 4.

Clocks of about 230 Hz are always input from the CPU 3 to the driver 4. The driver 4 performs the voltage conversion by using a high voltage VH supplied from a power source system, thereby generating a high voltage pulse for display.

The tactile information display 5 comprises bimorph elements and pins fixed to the tips thereof and has a display resolution corresponding to the cell array of the area photosensor 1 in a one-to-one relation.

Only the elements among the bimorph elements corresponding to the pattern information read by the area photosensor 1 are driven by the high voltage pulses. The pins fixed to the corresponding tips of the bimorph elements vibrate. Thus, the blind or sight-impaired user (or other user) can sense the pattern information on a plane as a vibration pattern.

When the memory mode is selected by the input device 6, the pattern information is output as the digital information from the area photosensor 1 to the tactile information display 5. Frame information is added to the read pattern data by the CPU 3 and is converted into memory data. Thereafter, the data is sequentially stored into a memory 7.

On the other hand, when the read mode is selected by the input device 6, the data stored in the memory 7 is sequentially converted into display data and displayed by the tactile information display 5.

It is assumed that the conventional reading process in which the information read by the area photosensor 1 is directly displayed by the tactile information display 5 can be also performed.

Figure 2:
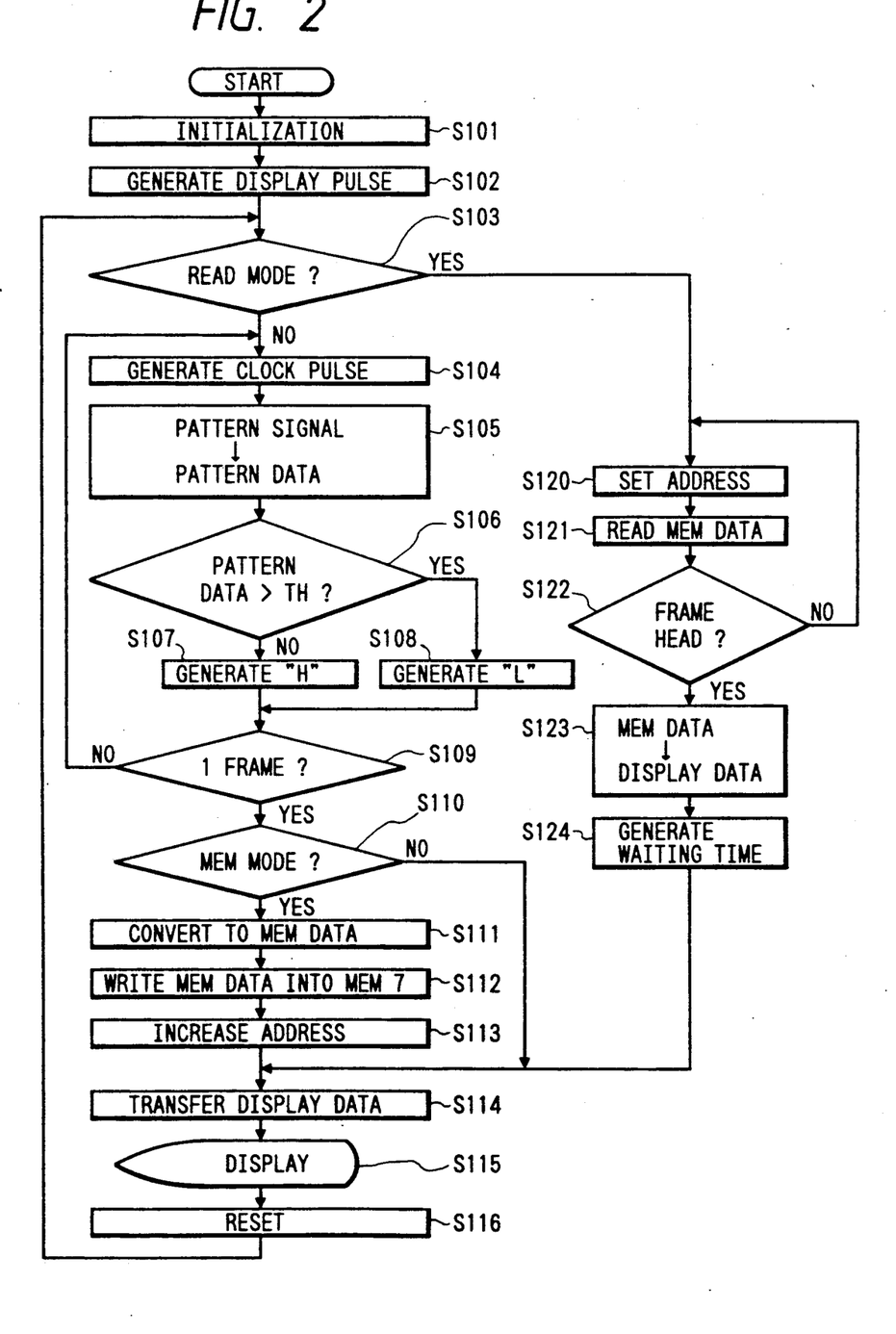
FIG. 2 is a flowchart showing a control procedure for a CPU in FIG. 1.

FIG. 2 is a flowchart showing the data input and output procedure for the CPU 3. It is assumed that the procedure shown in the diagram is stored in the ROM 3A as a program of the CPU 3.

When the apparatus is activated by turning on a power source or the like, each section is first initialized in step S101. In step S102, the generation of clocks of about 230 Hz to drive the tactile information display 5 is started.

In the next step S103, a check is made to see if the read mode has been set by the input device or not. If the read mode has been set, step S120 follows. On the other hand, if a mode other than the reading mode has been set, step S104 follows and a clock pulse to drive the area photosensor is produced and output.

In the next step S105, the pattern signal which is output every line by the area photosensor is converted into the pattern data by the converter 2. First, in step S106, a check is made to see if the pattern data is larger than the preset reference value TH or not in the converter 2. If NO in step S106, namely, if the pattern data is equal to or smaller than the reference value TH, step S107 follows and the H level signal is output. On the contrary, when the pattern data is larger than the reference value TH, the L level signal is output and the data of one line is produced in step S108.

In the next step S109, a check is made to see if the pattern of one frame consisting of a predetermined amount of information has been completely read or not by reference to a count value of a counter (not shown) or the like. If NO in step S109, the processing routine is returned to step S104 and the clock pulse is again output to the area photosensor 1 and the next read output is converted. In a manner similar to the above, the processes in steps S104 to S109 are repeated until the conversion of the display data of one frame is finished. After completion of the conversion of the display data of one frame, step S110 follows. An error correction code such as a CRC code or the like is also simultaneously generated and attached to the data of one frame.

In step S110, a check is made to see if the memory mode has been selected by the input device 6 or not. If the memory mode is not set, step S114 follows. If the memory mode has been set, in step S111, the frame information is added to the display data of one frame and the data is then converted into the memory data. Next, the memory data is written into the memory 7 in step S112. Thereafter, the memory address is increased by "1" in step S113 and the processing routine advances to step S114.

On the other hand, if the read mode has been set in step S103, the CPU 3 does not read the pattern from the area photosensor 1 but outputs the address in which the memory data is stored to the memory in step S120. In step S121, the memory data corresponding to one frame is read out of the memory. If an error is generated when the memory data is read out, it is necessary to correct the error on the basis of the frame information comprising the error correction code and the like added in step S111. For this purpose, a discriminating step S122 is provided.

In step S123, the display data is reproduced from the memory data. In step S124, a predetermined waiting time is formed by the timing operation of the timer 3B in order to synchronize with the frame period upon reading of the pattern. After step S124, step S114 follows.

In step S114, the display data is transferred to the driver 4 and converted into high voltage pulse for display. In step S115, the display data is displayed by the tactile information display 5. Thereafter, in step S116, the counter and the like are reset and the operation of display of the pattern information of one frame is finished. Then, the processing routine is returned to step S103.

By repeating the operating procedure in steps S103 to S116 in a manner similar to the above, the pattern information read by the area photosensor 1 is sequentially stored into the memory 7 and can be continuously scrolled and output by the display 5. On the other hand, by the processes in steps S120 to S124 and S114 to S116, the information which has been read and stored into the memory 7 can be similarly output by the display 5.

Figure 3:
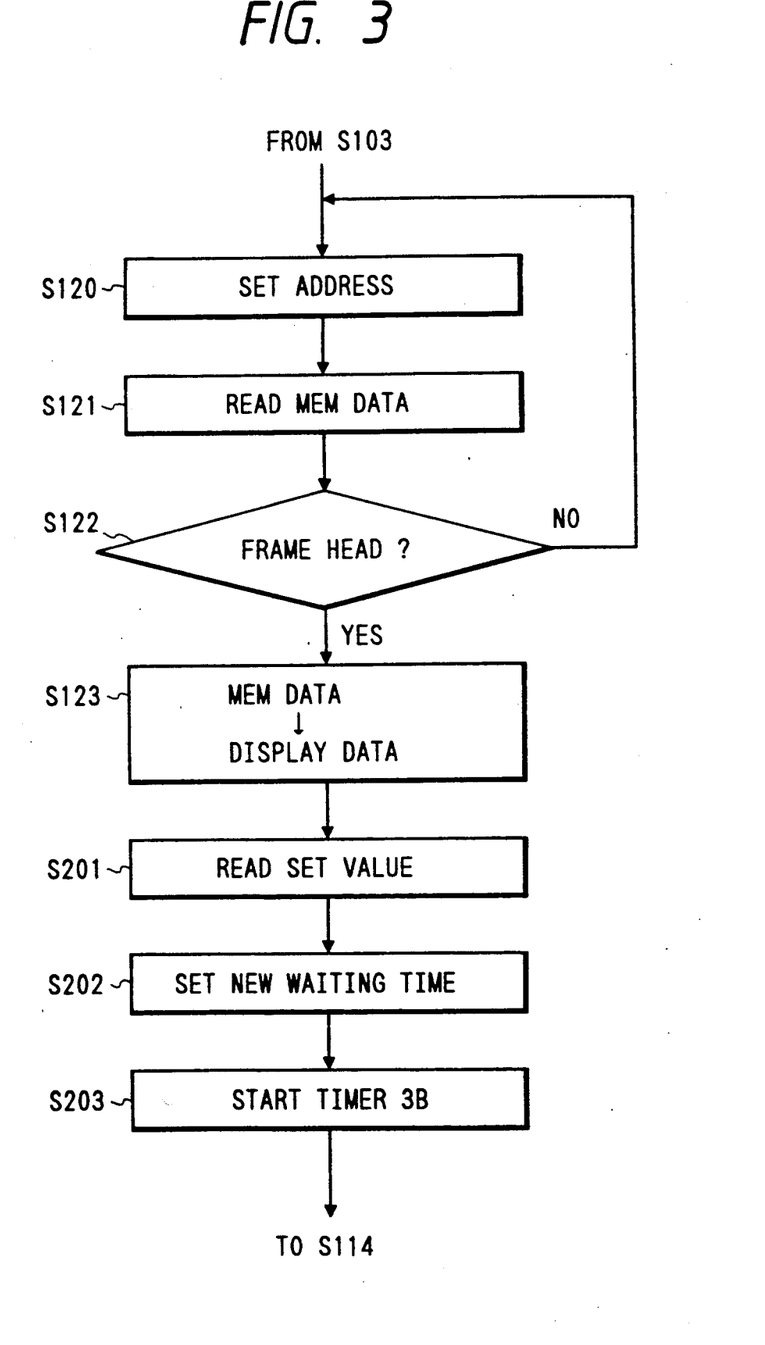
FIG. 3 is a flowchart for a case where a part of the procedure shown in FIG. 2 is modified.

FIG. 3 is a flowchart showing the reading processing procedure different from FIG. 2 and is used in place of the processes in steps S120 to S124 in FIG. 2. By the procedure shown in FIG. 3, the speed of reproducing of the memory data in the read mode which has been set to a predetermined value in step S124 in FIG. 2 can be varied.

In FIG. 3, after steps S120 to S123, steps S201 to S203 are newly provided. After completion of the data conversion in step S123, in step S201, by reading a voltage value set by a volume button provided in the input device 6 or the like, the set value of the waiting time corresponding to the reproducing speed is read. In step S202, the waiting time corresponding to the read set value is set into the timer 3B. In step S203, the timer 3B is activated and the waiting time between the frame display timings is formed.

By repeating the above operating procedure, the frame period upon reproduction of the memory data can be set to the optimum speed by adjusting the volume button provided in the input device 6.

According to the first embodiment described above, since the read pattern information can be stored and reproduced, the temporary storage of the read pattern information which caused a problem in the conventional reading device for the blind can be performed.

Therefore, for instance, in the case where the user carries the apparatus and read pattern information out of the house or office, for example, he or she can again immediately read the pattern information as necessary at a any place. There is no need to carry a recording apparatus such as a Braille typewriter. Therefore, even at a location such as, particularly, a library where the operating sound of the recording apparatus can be unacceptable noise, by using the apparatus of the invention, pattern information can be read and stored without any need for worrying about inconveniencing the people around the user.

On the other hand, according to the construction of FIG. 3, the reproducing speed of the memory data can be freely and variably set. Therefore, when a pattern is read, there is no need to be conscious of its recognizing performance but it is sufficient to read at a high speed. In the reproducing mode, the reproducing speed of only a portion in which it is difficult to recognize is made slow and the pattern data in this portion is displayed at a low speed. In this manner, flexible application can be also be realized.

On the other hand, at a location used for mass education, e.g., in school or the like, in the case of reading a certain original and allowing a number of students to touch it, it is sufficient to execute only once the reading of the original. The information of the same original can be touched and output any time. In such a case, with the construction of FIG. 3, the reproducing speed can be adjusted in accordance with the learning level of each student, so that the training efficiency can be improved. On the contrary, by previously storing the learning states of the students, the trainer does not need to be present. After completion of the training, the trainer can give proper advice by later reproducing the learning states of the students. Therefore, the load of the trainer can be reduced. As mentioned above, there are excellent advantages.

As will be obvious from the above description, according to the first embodiment of the invention, in a pattern information reading apparatus comprising: means for optically reading concentration pattern information; and means for displaying and outputting the read pattern information as the tactile information which is tactile by a fingertip or the like, wherein there is provided means for storing the pattern information read by the reading means; the pattern information stored in the memory means is reproduced and output as the tactile information by the display means as necessary. Therefore, the read pattern information is stored and can be reproduced and output as the tactile information as necessary. Consequently, not only can the pattern information be read in real time manner but also the read pattern information can be output any time without needing to read it again. There is an excellent advantage, viz., such that the application flexibility of the apparatus can be raised.

The second embodiment according to the invention will now be further described in detail with reference to the drawings. The second embodiment relates to the second subject mentioned above.

Figure 4:
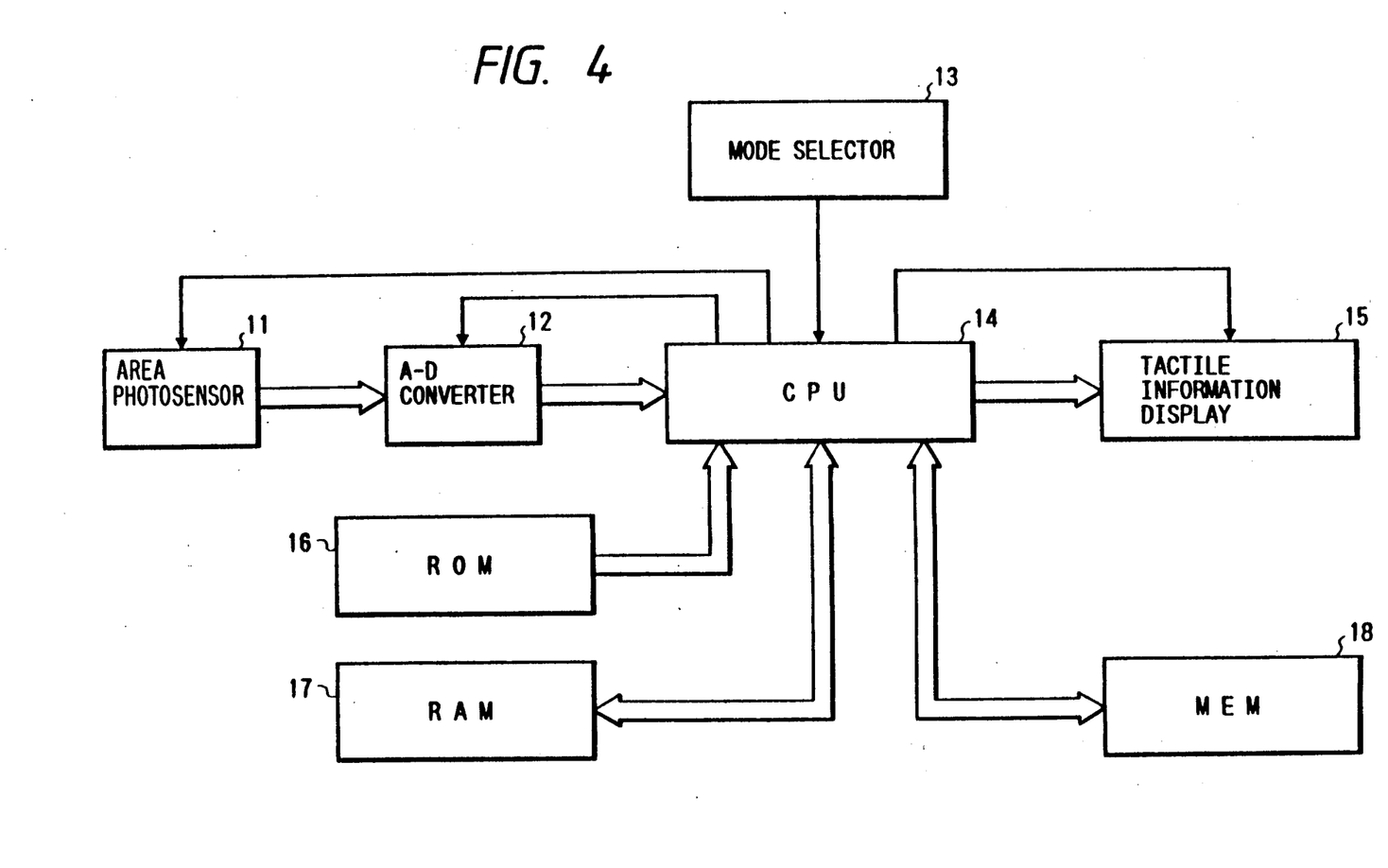
FIG. 4 is a block arrangement diagram of a pattern reading apparatus of the second embodiment.

FIG. 4 is a block arrangement diagram of a pattern reading apparatus according to the second embodiment. In the diagram, reference numeral 11 denotes an area photosensor for optically reading pattern information (characters, figures, symbols, etc.) on an original, converting the information into an electric signal and outputting the signal. Reference numeral 12 denotes an A-D converter to convert an analog output signal of the area photo sensor 11 into digital data. Reference numeral 13 indicates a mode selector which can select either any of a "normal mode" to directly perceive and display the read pattern information, a "memory mode" to execute both of the tactile display of the read pattern information and a predetermined storage procedure, and a "reproducing mode" to tactilely display the pattern information stored. Reference numeral 14 denotes a central processing unit (CPU) to perform the main control of the pattern reading apparatus; 16 represents a ROM in which control programs shown in, e.g., FIGS. 5 and 6 which are executed by the CPU 14 are stored; and 17 indicates a RAM to temporarily store the read pattern information. The CPU 14 uses the RAM 17 as a work area. A memory 18 stores the pattern information which is determined to be stored in the read pattern information. The memory 18 can store the read pattern data of, for instance, at least $ five pages of a maximum (e.g., A4 ) size. Reference numeral 15 denotes a tactile information display 15 for converting the read or stored pattern information into a tactilely vibration pattern and for tactile displaying the pattern. For instance, piezoelectric elements numbering 5 (in the lateral direction)×20 (in the vertical direction) are arranged like a matrix on the surface of the tactile display 15. The user can perceive the pattern information by putting her or his fingertip onto the display 15.

In the above construction, the area photo sensor 11 has a photosensitive area of sensor cells of, for instance, 5 (in the lateral direction)×20 (in the vertical direction) and outputs an electric read signal of one frame (5 in the lateral direction ×20 in the vertical direction) by the clock pulses from the CPU 14. The A-D converter 12 converts the electric read signal into a digital signal and outputs a series of frame data. Further, the CPU 14 compares each of the frame data with a predetermined threshold value TH. When the frame data is larger than the predetermined threshold value TH, it is determined that the frame data is data of a dark level. When the frame data is equal to or smaller than the value TH, it is decided that the frame data is the data of a bright level. In this manner, the frame data is converted into the binary pattern data and stored in the RAM 17. The tactile display 15 is driven on the basis of the binary pattern data. The display pulses of about 230 Hz are always input from the CPU 14 to the tactile display 15. The piezoelectric elements corresponding to the binary pattern data are vibrated, thereby performing the tactile display. In this manner, the user can perceive the two-dimensional optical pattern information as the three-dimensional vibration pattern information.

When the "memory mode" is selected by the mode selector 13, the read pattern information is directly output to the tactile display 15. When a predetermined condition is satisfied, the relevant read pattern information is sequentially stored in the memory 18. On the other hand, when the "reproducing mode" is selected, the pattern information read out of the memory 18 is output to the tactile display 15 in place of the read pattern information.

Figure 5:
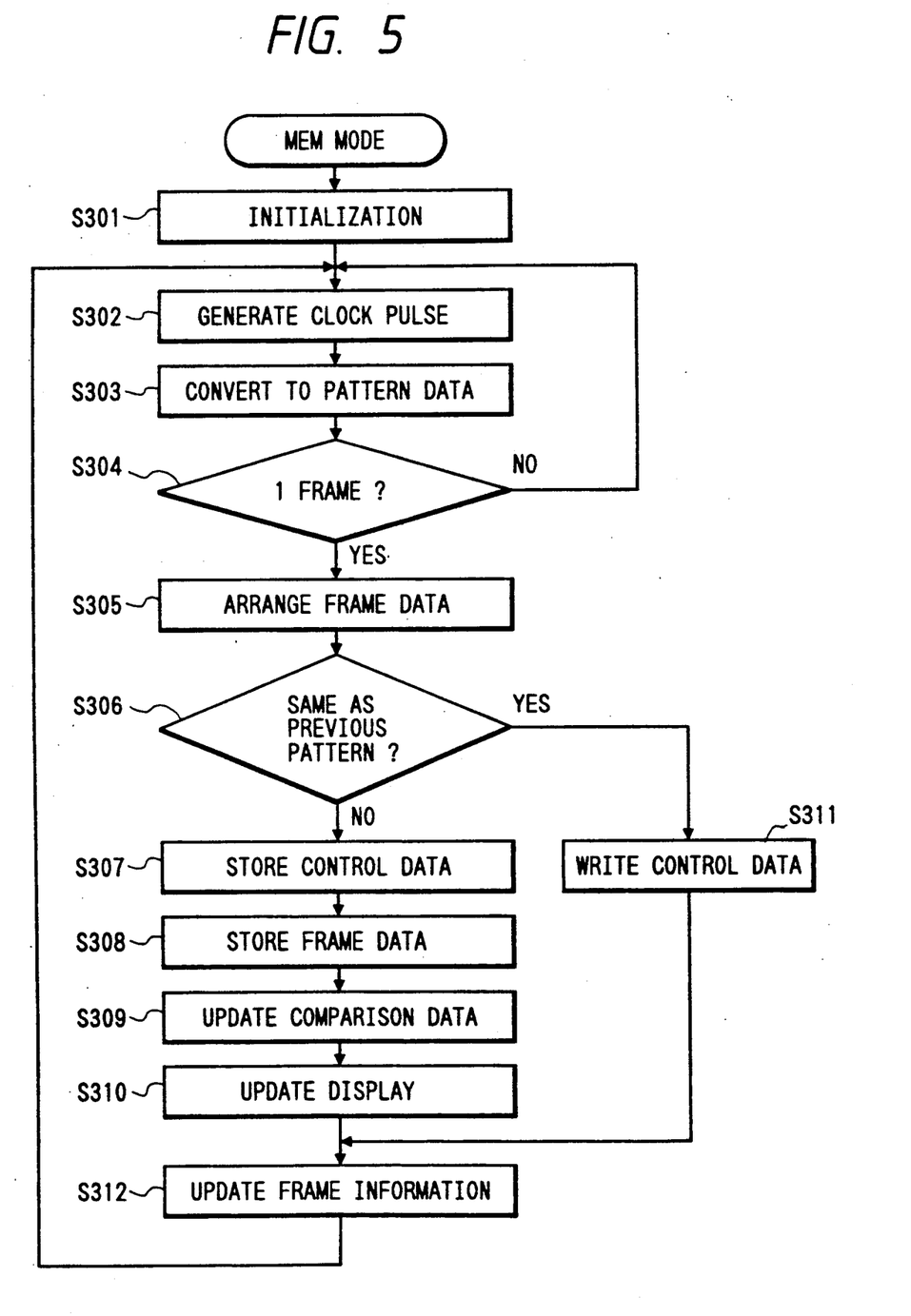
FIG. 5 is a flowchart for a reading and storing control procedure in the "memory mode" in the second embodiment.

FIG. 5 is a flowchart for a reading and storing control procedure in the "memory mode" in the second embodiment. In the diagram, in step S301, each section is initialized. For instance, the buffer area in the RAM 17 is cleared and the contents of the memory 18 are cleared. In step S302, a driving clock pulse is output to the area photosensor 11. In step S303, a line (lateral) signal of the area photosensor 11 is converted into the line data by the A-D converter 12 and is, further, converted into binary pattern data on the basis of the predetermined threshold value TH. In step S304, a check is made to see if the pattern information of one frame (20 lines) has been completely read or not. If NO in step S304, the processing routine is returned to step S302 and the pattern information of the next line is read. On the other hand, after completion of the reading of the pattern information of one frame, the binary pattern data of one frame is stored into the buffer area in the RAM 17 in step S305.

The reading of the data of one frame as mentioned above is executed at a predetermined reading interval in consideration of the ordinary moving speed of the reading unit. If the reading unit is not moved in this interval, the same pattern information is also obtained again in by the next reading operation. On the other hand, even if the reading unit is moved, if the reading position is on a blank portion of the original, the same white pattern information is derived. When an amount of movement of the reading unit is small, for instance, the pattern information deviating by one column is derived. This pattern information is not the same as the previous pattern information.

In step S306, the previous pattern information stored in the RAM 17 is compared with the present pattern information. If they differ, in step S307, control data (one byte) to indicate the updating of the tactile display data is stored in the memory 18. In the next step S308, the present pattern information is stored in the memory 18. In step S309, the previous pattern information is rewritten to the present pattern information. In step S310, the present pattern information is transmitted to the tactile display 15.

If the previous pattern information is the same as the present pattern information in step S306, control data (one byte) to indicate not to update the tactile display is written in step S311. In this case, the present pattern information is not stored in the memory 18. In step S312, the address in the memory 18 and the like are updated.

Figure 6:
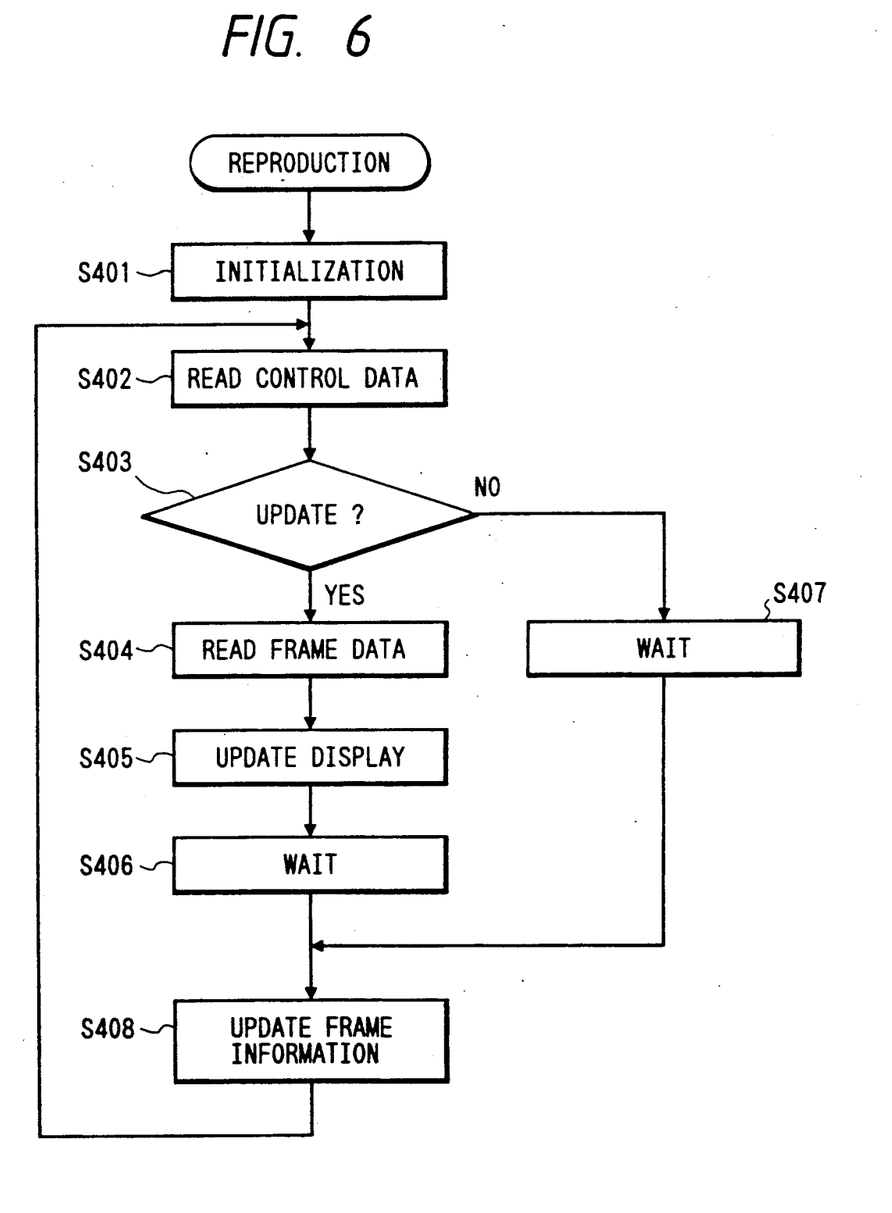
FIG. 6 is a flowchart for a processing procedure in the "reproducing mode" in the second embodiment.

FIG. 6 is a flowchart for the processing procedure in the "reproducing mode" in the second embodiment. In the diagram, each section is initialized in step S401. For instance, the address in the memory 18 is set to the head of the page. In step S402, the control data is read out of the memory 18. In step S403, a check is made to see if the control data indicates to update the display content or indicates not to update the display content. If the control data indicates the updating of the display content, step S404 follows and the subsequent pattern information (frame data) is read out of the memory 18. In step S405, the pattern information is displayed by the tactile display 15. In step S406, the apparatus waits for the lapse of a predetermined time. This is because by matching with a predetermined interval upon reading, a feeling in the actual reading operation is caused. If the control data indicates not to update the display content in step S403, the apparatus waits for the lapse of another predetermined time in step S407. Since the pattern information does not change, the previous pattern information is used and displayed. In step S408, the address in the memory 18 is updated.

In the second embodiment, the control data to indicate not to update the display content is stored each time the same pattern information is generated. However, in place of such a method, if a counter to count the number of times the same pattern information has been generated is provided, an amount of storage data can be further reduced by storing the count value.

As described above, according to the invention, even in a reading device for the blind, the pattern information can be stored and reproduced.

On the other hand, since the same pattern information is not stored, the memory capacity can be remarkably reduced. Consequently, the information in the case where the reading unit is stopped since it was difficult to recognize or the information in the blank portion between characters is extremely compressed.

What is claimed is:

1. A pattern information reading apparatus comprising:
   pattern reading means for reading pattern information by moving an optical reading unit;
   memory means for storing the pattern information read by said reading means;
   comparing means for comparing the pattern information which was read at a previous time and is presently stored in said memory means with the pattern information read at the present time;
   control means for controlling said memory means to update its data to the presently read pattern information when a comparison by said comparing means shows no coincidence between the presently-read and previously-read pattern information, and to store control data for instructing said memory means to again employ the previously read pattern information when a comparison by said comparing means shows coincidence between the presently read and previously-read pattern information; and tactile display means for outputting in a tactile way the presently read pattern information or the previously-read pattern information in response to the control data stored in said memory means.

2. An apparatus according to claim 1, wherein said tactile display means is constructed by a bimorph tactile device for selectively vibrating a plurality of pins arranged like a matrix.

3. A pattern information reading apparatus comprising:

means for optically reading concentration pattern information;

memory means for storing the pattern information read by said reading means;

comparing means for comparing pattern information presently read by said reading means with the stored pattern information;

control means for permitting said memory means to update its data to the pattern information presently read by said reading means when a comparison by said comparing means shows no coincidence between the pattern information presently-read by said reading means and the stored pattern information, and for inhibiting said memory means from updating its data when a comparison by said comparing means shows coincidence between the pattern information presently-read by said reading means and the stored pattern information; and display means for displaying and outputting the pattern information stored in said memory means as tactile information which is tactile by a fingertip or the like as necessary, wherein said control means permits said memory means to store the pattern information presently-read by said reading means and to store first control data for instructing said memory means to update its data when a comparison by said comparing means shows no coincidence between the pattern information presently read by said reading means and the stored pattern information, and to store second control data for instructing said memory means not to update its data or data for indicating a number of times which said memory means has been instructed not to update its data when a comparison by said comparing means shows coincidence between the pattern information presently- read by said reading means and the stored pattern information.

4. A pattern information reading apparatus comprising:

pattern reading means for reading pattern information by moving an optical reading unit;

memory means for storing the pattern information read by said reading means;

comparing means for comparing the pattern information which was read at a previous time and is presently stored in said memory means with the pattern information rad at the present time;

control means for permitting said memory means to update its data to the presently read pattern information when a comparison by said comparing means shows no coincidence between the presently-read and previously-read pattern information, and for inhibiting said memory means from updating its data when a comparison by said comparing means shows coincidence between the presently-read and previously-read pattern information; and tactile display means for outputting the pattern information read out of said memory means in a tactile format.

wherein said control means permits said memory to store the presently read pattern information and to store first control data for instructing said memory means to update its data when a comparison by said comparing means shows no coincidence between the presently-read and the previously-read pattern information and to store second control data for instructing said memory means not to update its data or data for indicating a number of times which said memory means has been instructed not to update its data when a comparison by said comparing means shows coincidence between the presently-read and previously-read pattern information.

5. An apparatus according to claim 1, wherein said control means permits said memory means to store the presently-read pattern information and control data for instructing said memory means to update its data when a comparison by said comparing means shows no coincidence between the presently-read and previously-read pattern information, and to store the control data for instructing said memory means to again employ the previously-read pattern information or data for indicating a number of times which said memory means has been instructed to again employ the previously-read pattern information.

* * * * *

UNITED STATES PATENT AND TRADEMARK OFFICE
CERTIFICATE OF CORRECTION

PATENT NO. : 5,103,485
DATED : April 7, 1992
INVENTOR(S) : YASUHIRO YAMADA ET AL.

Page 1 of 2

It is certified that error appears in the above-identified patent and that said Letters Patent is hereby corrected as shown below:

COLUMN 1

Line 52, "extremely" should be deleted.
 Line 53, "costs" should read --cost--.
 Line 63, "necessary" should read --necessary,--.

COLUMN 2

Line 27, "and for reading that data" should read
    --and second preferred embodiments,--.
 Line 28, "from the memory for display," should be deleted
    and "drawings" should read --drawings,--.

COLUMN 4

Line 23, "S104 and" should read --S104,--.
Line 47, "memory" (2nd occurrence) should read --memory 7--.
 Line 62, "pulse" should read --pulses--.

COLUMN 5

Line 4, "into" should read --in--.
 Line 10, "is" should be deleted.
 Line 23, "into" should read --in--.
 Line 36, "read" should read --reads--.
 Line 38, "necessary" should read --necessary,--.
 Line 39, "at a" should be deleted.
 Line 51, "performance" should read --performance,--.
 Line 53, "in which it" should read --which--.
 Line 55, "be" should be deleted.

UNITED STATES PATENT AND TRADEMARK OFFICE
CERTIFICATE OF CORRECTION

PATENT NO. : 5,103,485

DATED : April 7, 1992

INVENTOR(S) : YASUHIRO YAMADA ET AL.

It is certified that error appears in the above-identified patent and that said Letters Patent is hereby corrected as shown below:

COLUMN 6

Line 3, "there" should read --these--.
    Line 38, "either" should be deleted and
        ""normal mode"" should read --"normal mode,"--.
    Line 39, ""memory mode"" should read --"memory mode,"--
    Line 53, "$" should be deleted.
    Line 56, "tactilely" should read --tactile--.
    Line 57, "tactile" should read --tactilely--.

COLUMN 10

Line 12, "rad" should read --read--.
    Line 24, "format." should read --format,--.

Signed and Sealed this

Twenty-fourth Day of August, 1993

Attest:

BRUCE LEHMAN

Attesting Officer     Commissioner of Patents and Trademarks